United States Patent
Trigiani (10) Patent No.: US 8,405,346 B2
(45) Date of Patent: Mar. 26, 2013

(54) INDUCTIVELY COUPLED POWER TRANSFER ASSEMBLY

(75) Inventor: Antonio Trigiani, Bristol, TN (US)

(73) Assignee: Diversified Power International, LLC, Piney Flats, TN (US)

( * ) Notice: Subject to any disclaimer, the term of this patent is extended or adjusted under 35 U.S.C. 154(b) by 452 days.

(21) Appl. No.: 12/706,914

(22) Filed: Feb. 17, 2010

(65) Prior Publication Data

US 2010/0207771 A1 Aug. 19, 2010

Related U.S. Application Data

(60) Provisional application No. 61/153,118, filed on Feb. 17, 2009.

(51) Int. Cl.
*H02J 7/00* (2006.01)
(52) U.S. Cl. ........................................ 320/108
(58) Field of Classification Search .................... 320/108
See application file for complete search history.

(56) References Cited

U.S. PATENT DOCUMENTS

| | | | |
|---|---|---|---|
| 5,539,296 A | 7/1996 | Ito | |
| 5,568,036 A | 10/1996 | Hulsey et al. | |
| 5,712,795 A * | 1/1998 | Layman et al. | 700/297 |
| 5,803,215 A | 9/1998 | Henze et al. | |
| 5,821,731 A | 10/1998 | Kuki et al. | |
| 5,949,155 A | 9/1999 | Tamura et al. | |
| 5,954,520 A | 9/1999 | Schmidt | |
| 6,042,385 A | 3/2000 | Watanabe et al. | |
| 6,127,800 A | 10/2000 | Kuki et al. | |
| 6,150,794 A * | 11/2000 | Yamada et al. | 320/108 |
| 6,478,614 B1 | 11/2002 | De'Longhi | |
| 6,736,646 B2 | 5/2004 | Takahashi et al. | |
| 2007/0114969 A1* | 5/2007 | Marmaropoulos | 320/108 |
| 2008/0238364 A1* | 10/2008 | Weber et al. | 320/108 |

* cited by examiner

*Primary Examiner* — Arun Williams
(74) *Attorney, Agent, or Firm* — Knox Patents; Thomas A. Kulaga (57) ABSTRACT

Apparatus for transferring power to through an isolated, insulated connection. A power transfer assembly includes a portable cable assembly and a receiver. The portable cable assembly includes a power plug and a transmitter with a plug portion that mates with a receptacle on the receiver. A magnetic latch secures the plug portion in the ring receptacle. The transmitter includes a power supply, a power switch, a signal sensor, and a transmitting inductor. The receiver includes a receiving inductor, a signal coil, a magnet, a power converter, a temperature sensor, and an isolation switch. When the transmitter is coupled with the receiver, the power switch is operated by the magnet, the signal sensor is magnetically coupled to the signal coil, and the transmitting inductor is magnetically coupled to the receiving inductor. The normally open isolation switch is operated when the power converter is energized by the transmitter.

20 Claims, 4 Drawing Sheets

Fig. 5

INDUCTIVELY COUPLED POWER TRANSFER ASSEMBLY

CROSS-REFERENCE TO RELATED APPLICATIONS

This application claims the benefit of U.S. Provisional Application No. 61/153,118, filed Feb. 17, 2009.

STATEMENT REGARDING FEDERALLY SPONSORED RESEARCH OR DEVELOPMENT

Not Applicable

BACKGROUND OF THE INVENTION

1. Field of Invention

This invention pertains to a device for transferring power to a mobile device, such as a vehicle that requires electrical power to charge a battery.

2. Description of the Related Art

Commercially available electric vehicles are powered by a battery system. The batteries must be periodically recharged in order to continue to provide motive power to the vehicle. Other types of vehicles commonly use batteries for starting and powering accessories on the vehicle. These batteries are charged by the prime mover, typically. But, when such a vehicle is stored or not otherwise used for extended periods of time, the battery must be periodically charged to maintain optimum service life.

To charge and maintain these batteries, the vehicle is connected to an external power source. In some cases, the external power source is an external battery charger in which the output of the charger is connected to the battery of the vehicle. In other cases, the external power source is a power distribution system that is connected to an on-board battery charger.

Many other vehicles and portable devices have an electrical system that often includes a battery or battery system. It is often desirable to operate these vehicles and devices from an external power source when the vehicles and devices are at a fixed location. Such vehicles and devices are typically powered by extension cords that mechanically and electrically connect to the vehicle or device to provide external power.

For example, electric carts carry multiple lead acid batteries that power an electric motor. To charge the batteries, the cart is connected to an external battery charger. A cable from the battery charger plugs into a receptacle on the vehicle to form a mechanical and electrical connection between the charger and the vehicle. Typically, the cable has a female plug and the vehicle has a receptacle with male prongs. The receptacle is typically mounted on or adjacent the battery.

BRIEF SUMMARY OF THE INVENTION

A power transfer assembly includes a portable cable assembly with a plug or transmitter and a receptacle or receiver. The portable cable assembly is configured to electrically connect to the power mains to provide power for another device, such as a battery in a vehicle. The plug of the portable cable assembly mates with a receptacle attached to the vehicle.

The plug and the receptacle of the power transfer assembly are held together by magnetic attraction when connected. In this way, the plug and receptacle are separable when a tensile force is applied between them, such as when the vehicle moves away with the plug connected to the receptacle. The magnetic force is sufficiently weak to allow the plug and the receptacle to disengage, yet strong enough to allow the plug and connector to remain engaged during use.

The plug and receptacle of the power transfer assembly are electrically isolated and rely upon magnetic coupling to transfer power and signals. In this way, the vehicle is electrically isolated from the electrical distribution system providing power to charge the vehicle. The electrical isolation provides galvanic isolation between the power source and the vehicle or other device.

The plug has a power switch that is actuated when the plug engages the receptacle. In this way, the plug is energized only when mated with the receptacle and does not consume any power when not being used. The receptacle includes an isolation switch that isolates the battery when the receptacle is not receiving power from the plug. In this way the receptacle circuit will not be seen as a load by the battery and the battery will not discharge through the receptacle circuit.

In one embodiment, the receptacle provides a feedback signal to the circuitry in the plug. The feedback signal is magnetically transferred between the receptacle and plug. The feedback signal controls the power transfer from the plug to the receptacle. In this way, the power consumption of the power transfer system is controlled to meet the charging requirements of the battery.

The power transfer assembly includes a portable cable assembly and a fixed receptacle. The portable cable assembly has a standard power plug on one end and a power supply with an encapsulated inductor on the other end. The fixed receptacle includes a mating inductor and a power converter. The fixed receptacle is configured to be incorporated in a mobile battery operated device, for example, an electric vehicle or a lawn mower that uses a battery to operate the starter motor. In one embodiment, the power converter is a battery charger and along with the mating inductor is a circuit that controls the charging voltage inversely related to temperature. That is, as the temperature falls, the voltage increases for maintaining a charge on the battery in cold weather.

Another aspect of the invention is a connector assembly in which the vehicle side has a cup-like female connector into which the male cable-end connector fits. The male is keyed to the female such that the plug and receptacle are aligned when connected. A magnetic latch includes magnets that hold the plug in position. The receptacle also includes a member that prevents the surfaces of the plug and receptacle from sliding from any shearing forces. The receptacle also includes a magnet that actuates a power switch that energizes the inductor in the male connector. The female connector includes a relay or isolation switch that is actuated when a powered connection is established. The relay isolates the vehicle battery from the charging circuit when an external power source is not available. In various embodiments, the receptacle and/or plug includes status indicators. In one embodiment, the status indicator is an LED that illuminates a translucent ring into which the male connector fits.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Apparatus for a power transfer assembly 100 is disclosed. The power transfer assembly 100 is suitable for connecting a vehicle to an external power source 320.

Figure 1:
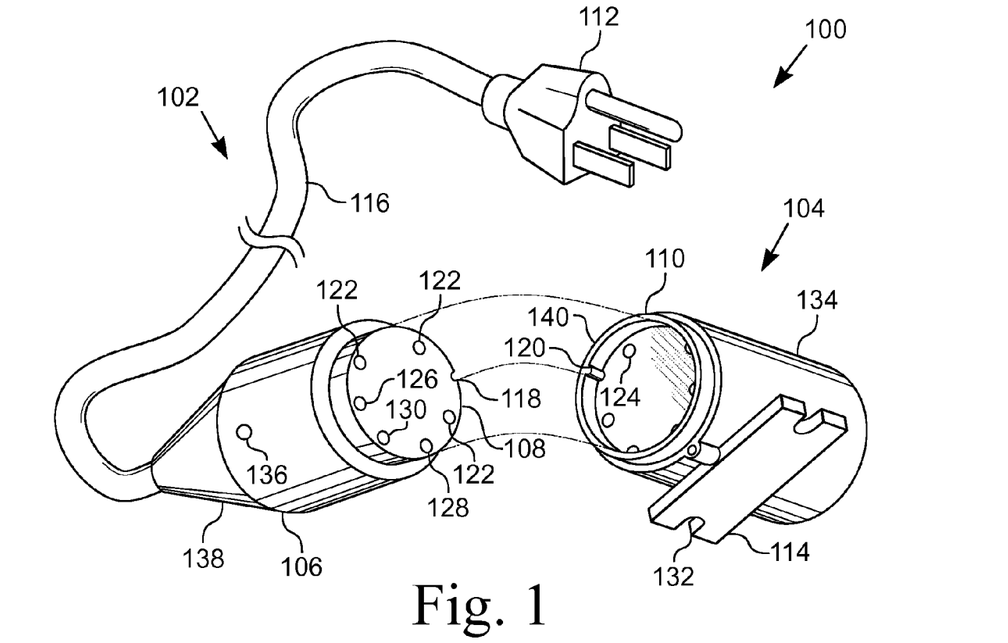
FIG. 1 is a perspective view of one embodiment of a power transfer assembly.
Figure 2:
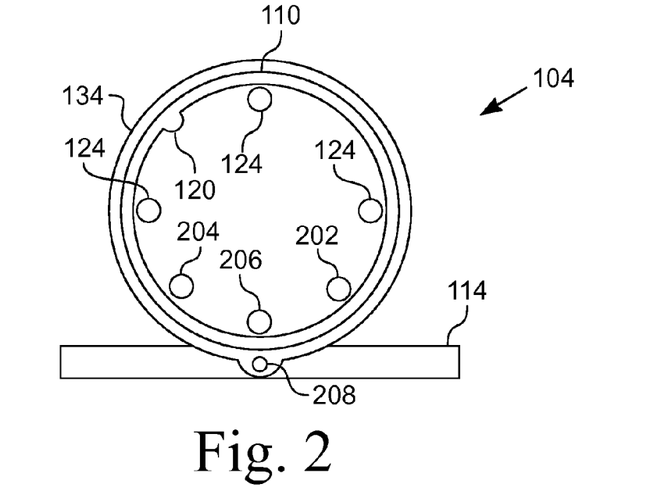
FIG. 2 is a front view of one embodiment of a receiver.

FIG. 1 illustrates a perspective view of one embodiment of a power transfer assembly 100. The power transfer assembly 100 includes a portable cable assembly 102 and a power receiver 104. FIG. 2 illustrates a front view of one embodiment of a receiver 104. The portable cable assembly 102 includes a power plug 112 that connects to a transmitter, or plug, 106 with a cable 116. The power plug 112 is configured to connect to a conventional power receptacle 318, such as a standard three prong 115 vac receptacle. Those skilled in the art will recognize that power receptacles vary widely and that the power plug 112 can be configured to be used with them without departing from the spirit and scope of the present invention. The cable 116 is physically secured to the transmitter 106 by a strain relief 138, which allows a pulling force on the cable 116 to disconnect the transmitter 106 from the receiver 104 without damaging the power transfer assembly 100.

The transmitter 106 has a plug portion 108 that mates with a receptacle 110 on the receiver 104. The receptacle 110 includes a collar 140 with an inside dimension configured to receive the protruding plug 108 of the transmitter housing 106. The collar 140 has a protrusion, or key, 120 that mates with the alignment notch 118 on the protruding plug 108. The protrusion 120 aligns the plug 108 with respect to the collar 110 so that the transmitter 106 is aligned with the receiver 104. The plug portion 108 with the keyed notch 118 mates with the corresponding key 120 on the collar 140. The plug portion 108 is pushed into the receptacle 110 when the notch 118 is aligned with the key 120. To separate the transmitter 106 from the receiver 104, the transmitter 106 is pulled from the receptacle 110. In one embodiment, the receptacle 110 has a height that is sufficiently low such that the transmitter 106 is separable when a lateral force is applied to the cable end of the transmitter 106. In such an embodiment, the transmitter 106 is separable from the receiver 104 when, for example, someone trips over the cable 116 or when the vehicle with the receptacle 104 moves away from the portable cable assembly 102.

The illustrated plug portion 108 has three magnetic latches 122 that engage corresponding magnetic latches 124 inside the receptacle 110. The plug portion 108 extends from the main body of the transmitter 106 a distance equal to the depth of the receptacle 110. In this way the corresponding magnetic latches 122 attract each other and hold the transmitter housing 106 and the plug 108 inside the collar 110 of the receiver 104. The magnetic latches 122 provide the axial attraction that keeps the plug portion 108 proximate the inside of the receptacle 110. The collar 140 of the receptacle 110 provides lateral support that prevents the plug portion 122 from sliding along the surface bounded by the receptacle 110. The receptacle 110 includes an alignment mechanism. In one embodiment, the alignment mechanism includes a collar 140 with a key 120 and a plug portion 108 with a notch 118, as illustrated. In other embodiments, the alignment mechanism includes members, such as pins or protrusions, that serve to align and laterally support the plug portion 108 in an aligned position on the inside face of the receptacle 110. The configuration of the receptacle housing 134 and the receptacle 110 and the transmitter housing 106 and the protruding plug portion 108 is such that an axial force will separate the transmitter 106 from the receiver 104 without placing undue strain on the portable cable 116 or the fixed receptacle 112. Further, the transmitter 106 and the receiver 104 have no exposed conductors and are electrically insulated, thereby allowing the portable cable assembly 102 and the fixed receptacle 104 to be used in hazardous or unprotected environments and to be handled with no special care.

The magnetic latches 122, 124, in various embodiments, include a magnet in one or both of the transmitter 106 and the receiver 104. In one such embodiment, the receiver 104 includes magnets 124 that engage ferrous members 122 in the plug portion 108. In another embodiment, both the receiver 104 and the plug portion 108 have magnets 124, 122 in which the poles are arranged such that the plug portion 108 latches in the receptacle 110. In one such embodiment, the polarity of the magnets 122, 124 are such that the plug portion 108 is able to mate with the receiver 104 with only a single orientation, thereby serving the function of the alignment mechanism instead of the key 120 and notch 118. For example, the exposed pole of the magnets 122 in the plug portion 108 are of one polarity, such as north, with the exception of one magnet 122, which has the south pole exposed. The magnets 124 in the receiver 110 have their south pole exposed except for the magnet that corresponds to the south pole magnet 122 of the plug portion 108. In this way, the plug portion 108 will only magnetically latch to the receiver 108 when the north poles are positioned proximate the south poles, which will occur with only a single orientation. In such an embodiment, the key 120 and notch 118 are not necessary to align the plug portion 108 to the receptacle 110.

The magnetic latches 122, 124 have sufficient attractive force to support the transmitter 106 within the receptacle 110, including the weight of the cable 116 hanging from the transmitter 106. The magnetic latches 122, 124 have sufficient attractive force to allow the transmitter 106 and the receiver 104 to separate with a pulling force on the transmitter 106 that is less than the force that could possibly damage the power transfer assembly 100. For example, the magnetic latches 122, 124 secure the transmitter 106 to the receiver 104 until such time that a human operator decides to disengage the transmitter 106 from the receiver 104. In another example, the magnetic latches 122, 124 secure the transmitter 106 to the receiver 104 until the vehicle to which the receiver 104 is mounted moves away from where the power plug 112 is connected to the power receptacle. In such an embodiment, the transmitter 106 is separable from the receiver 104 without damaging the power transfer assembly 100.

The receiver 104 in the illustrated embodiment includes a body 134 and a mounting bracket 114. The mounting bracket 114 includes slots or openings 132 configured to secure the receiver 104 to a surface. The receptacle 110 is configured to protrude through an opening in a panel or plate. A hole 208 is provided for an anti-rotation screw that secures the receiver 104 relative to the panel or plate and prevents rotation of the receiver 104 if there is any rotary force applied through the transmitter 106 connecting to the receptacle 110. Those skilled in the art will recognize that any number of configurations are possible for attaching the receiver 104 to a vehicle such that the receptacle 110 is exposed to receive the plug portion 108.

In the illustrated embodiment, an LED 202 inside the receptacle 110 projects into a light tube 126 in the face of the plug portion 108 of the transmitter. The light tube 126 terminates in a lens 136 on the side of the transmitter 106, thereby providing convenient indication of the status of the power transfer assembly 100. In another embodiment, the receptacle 110 is a translucent material that is illuminated by the LED 202. In one such embodiment, the LED 202 provides low level illumination when the transmitter 106 is not connected, thereby allowing convenient access to the receptacle 110 in low light levels.

A signal coil 204 is positioned inside the receptacle 110 of the receiver 104. The signal coil 204 is aligned with a sensor 128 in the plug portion 108 of the transmitter 106. In one embodiment, the signal coil 204 provides a feedback signal to the transmitter 106 for controlling the power transfer from the transmitter 106 to the receiver 104. The feedback signal is received by the sensor 128. In another embodiment, the signal coil 204 and the sensor 128 form a two-way communications link between the transmitter 106 and the receiver 104. In such an embodiment, the transmitter 106 provides a signal to the receiver 104 regarding the transmitter 106 capabilities and identification information. For example, if the portable cable assembly 102 is configured to provide a specified amount of power, for example, because it plugs into a power receptacle providing a specific voltage, e.g., 115 vac or 220 vac, and having a specific current rating, e.g., 15 or 30 amps. In this way, the portable cable assembly 102 is selected to match the available power while still capable of mating with a single receiver 104. The receiver 104 queries the transmitter 106 and operates according to the parameters of the specific portable cable assembly 102 being used.

The receiver 104 has a magnet 206 in the receptacle 110 that engages a magnetic switch 130 in the plug portion 108 of the transmitter 106. With the transmitter 106 engaging the receiver 104, the magnet 206 actuates the switch 130, which controls the transmitter 106. For example, the transmitter 106 is de-energized when it is not plugged into the receiver 104. When the transmitter 106 is plugged into the receiver 104, the switch 130 is actuated and energizes the transmitter 106. In this way there is no energy consumption except when the portable cable assembly 102 is in a position to transfer power to the receiver 104.

Figure 3:
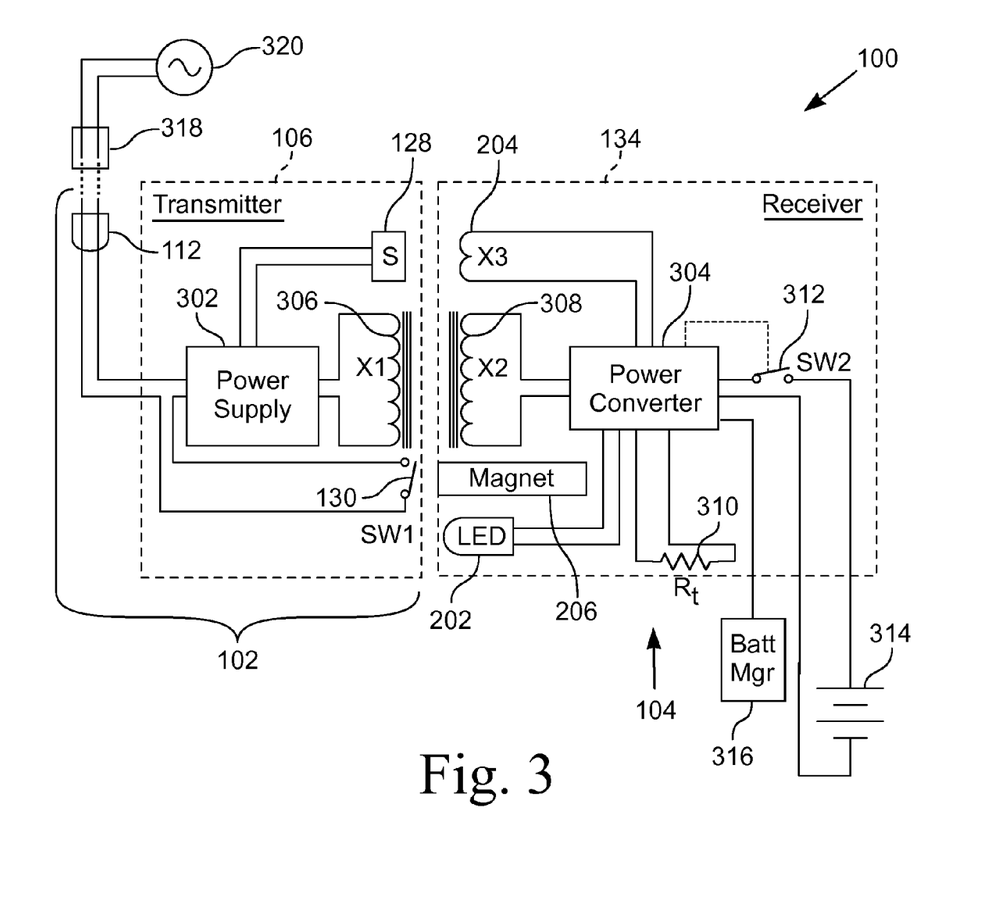
FIG. 3 is a schematic diagram of one embodiment of the power transfer assembly.

FIG. 3 illustrates a schematic block diagram of one embodiment of the power transfer assembly 100 with the transmitter 106 magnetically coupled to the receiver 104. The power plug 112 is configured to connect to a power receptacle 318, which is connected to an external power supply 320. The power plug 112 is connected to a power supply 302 and a power switch 130 in the transmitter 106. The power switch 130 is actuated by the magnet 206 in the receiver 104. The power switch 130 is normally open and closes when proximate a magnetic field. One example of such a switch is a reed switch. The power switch 130 selectively connects the external power source 320 to the transmitter power supply 302 when the transmitter 106 is plugged into the receiver 104.

The power supply 302 is connected to a transmitting inductor X1 306 and a magnetic sensor S 128. The transmitting inductor 306 is magnetically coupled to the receiving inductor X2 308 when the transmitter 106 is plugged into the receiver 104. The power supply 302 converts the power from the external power source 320 to efficiently transfer power from the transmitting inductor 306 to the receiving inductor X2 308. The transmitting inductor 306 is positioned proximate the distal surface of the plug portion 108. The receiving inductor 308 is positioned proximate the inside surface of the receptacle 110. The configuration of the transmitting and receiving inductors 306, 308 is such that the two inductors 306, 308 are magnetically coupled when the plug portion 108 is received by the receptacle 104 and latched by the magnetic latches 122, 124.

In one embodiment, the power supply 302 is an analog circuit that includes a power converter circuit, a PWM circuit, and a power switching circuit that excites the transmitting inductor 306. In another embodiment, the power supply 302 may include digital components that perform some of the circuit functions that convert the power from the external power source 320 into energy that excites the transmitting inductor 306.

In the illustrated embodiment, the receiver 104 includes the receiving inductor X2 308 connected to a power converter 304, which is a battery charger connected to a battery 314 and a battery management system 316. The battery 314 includes one or more cells or banks. The battery management system 316 is a control system that is operatively connected to the battery 314. The charger 304 converts the power from the receiving inductor 308 to a charging voltage and current sufficient to charge the battery 314. In one embodiment, the charger 304 communicates with a battery management system 316. In one such embodiment, the battery management system 316 receives information on the capacity of the power transfer assembly 100 and such information is used to manage the battery 314, which is typically composed of multiple cells or batteries.

Between the power converter, or charger, 304 and the battery 314 is an isolation switch SW2 312. The isolation switch 312 is operated by the charger 304. When the charger 304 is energized and capable of charging the battery 314, the isolation switch 312 is closed, thereby connecting the battery 314 to the charger 304. When the charger 304 is not capable of charging the battery 314, such as when the transmitter 106 is not coupled to the receiver 104, the switch 312 is open, thereby isolating the battery 314 from the receiver 104 and preventing discharge or draining of the battery 314 through the receiver 104. In various embodiments, the switch 312 is an electromechanical relay or an electrical switching circuit.

The charger 304 is connected to a signal coil X3 204 that communicates with a sensor 128 in the transmitter 106. The signal coil 204 and sensor 128 form part of the feedback loop from the charger 304 to the power supply 302. In this way the power supply 302 actively controls the power transfer through the inductors 306, 308 by controlling the power to the transmitting inductor 306 with the power transfer being at a level sufficient to meet the needs of the charger 304.

In one embodiment, the sensor 128 is a Hall effect device. In other embodiments, the sensor 128 is a coil or other device responsive to a magnetic field. In one embodiment, the sensor 128 communicates with the power supply 302 to regulate the duty cycle of the pulse width modulation (PWM) control signal that controls the switching of a transistor that powers the transmitting inductor 306. The sensor 128 is magnetically coupled to the signal coil 204 when the transmitter 106 is coupled to the receiver 104. The signal coil 204 is responsive to a signal from the charger 304. For example, the charger 304 adjusts the power to the battery 314 in order to meet charging requirements. When the charger 304 requires more power for charging the battery 314, a signal is communicated to the signal coil 204 and received by the sensor 128. The sensor 128 then communicates with the power supply 302 and the power supply 302 responds by increasing the power to the transmitting inductor 306. Conversely, when the charger 304 requires less power for charging the battery 314, a signal is communicated to the signal coil 204 and received by the sensor 128. The sensor 128 then communicates with the power supply 302 and the power supply 302 responds by decreasing the power to the transmitting inductor 306. In this way, the power transfer from the transmitter 106 to the receiver 104 is limited to only the amount that is necessary for the charger 304 to charge the battery 314 and meet other needs of any device connected to the charger 304.

In another embodiment, the sensor 128 includes a sending unit, such as a coil, that communicates the signal coil 204 in the receiver 104. In such an embodiment, the sensor coil 128 and the signal coil 204 establish a two-way communications path.

The charger 304 is also connected to a light emitting diode (LED) 202 or other indicator. The indicator 202 provides an indication of the charger 304 and/or battery 314 status. For example, when the battery 314 is being charged by the charger 304, the indicator 202 flashes at a particular rate or emits a specific color. When the battery 314 is fully charged, the indicator 202 illuminates continuously or emits another color. In another example, the indicator 202 provides indication of error conditions in the receiver 104, such as a high temperature condition or a battery 314 that is not accepting a charge. Such conditions can be indicated by specific flash patterns and/or emitted colors.

The receiver also includes a temperature sensor $R_t$ 310 that senses the ambient temperature. The temperature sensor 310 communicates with the charger 304 to regulate the voltage. In one embodiment, the temperature sensor 310 is a thermister with a negative temperature coefficient that allows the charger 304 to vary the charging voltage based on temperature. The temperature sensor 310 is located so as to measure the temperature proximate the battery 314. In one such embodiment, the temperature sensor 310 is located remote from the receiver 104. In one example, the charger 304 uses the temperature sensor 310 to regulate the voltage during float conditions, that is after the battery 314 is fully charged and the charger 304 is operating in a maintenance mode. For example, with an ambient temperature of 10° Centigrade, the voltage applied to the battery 314 is 13.9 vdc and, with an ambient temperature of 35° Centigrade, the voltage applied to the battery 314 is 12.5 vdc. These float voltages differ from a float voltage of 13.2 vdc that is applied during a normal room temperature of 20° Centigrade.

In the embodiment discussed above, the power converter 304 is a battery charger that is configured to charge a battery 314. In another embodiment, the power converter 304 receives power from the receiving inductor 308 and converts it into an output at a specific voltage. In such an embodiment, the output of the power converter 304 feeds a battery charger or other devices external to the receiver 104. For example, the receiver 104 is attached to a marine vessel and the receiver 104 provides power to the vessel's electrical system, which may include an on-board battery charging system. The electrical isolation of the transmitter 108 from the receiver 104 ensures galvanic isolation between the external power source 320 and the electrical system connected to the receiver 104.

FIG. 3 illustrates a simplified schematic of one embodiment of a power transfer assembly 100. The simplified schematic does not illustrate various connections, for example, power and ground connections to the various components; however, those skilled in the art will recognize the need for such wiring and understand how to wire such a circuit, based on the components ultimately selected for use.

As used herein, the power converter 304 should be broadly construed to mean any device that accepts inputs and provides outputs based on the inputs, for example an analog control device or a processor or computer that executes software, or a combination thereof. In various embodiments, the power converter 304 is one of a specialized device or a computer for implementing the functions of the invention. The power converter 304 includes input/output (I/O) units for communicating with external devices and a processing unit that varies the output based on one or more input values. A computer-based power converter 304 includes a memory medium that stores software and data and a processing unit that executes the software. Those skilled in the art will recognize that the memory medium associated with the computer-based power converter 304 can be either internal or external to the processing unit of the processor without departing from the scope and spirit of the present invention.

The input component of the power converter 304 receives input from external devices, such as the temperature sensor 310 and the receiving inductor 308. The output component sends output to external devices, such as the isolation switch 312 and battery 314 or external electrical system, the signal coil 204, and the indicator 202. The storage component stores data and program code.

Figure 4:
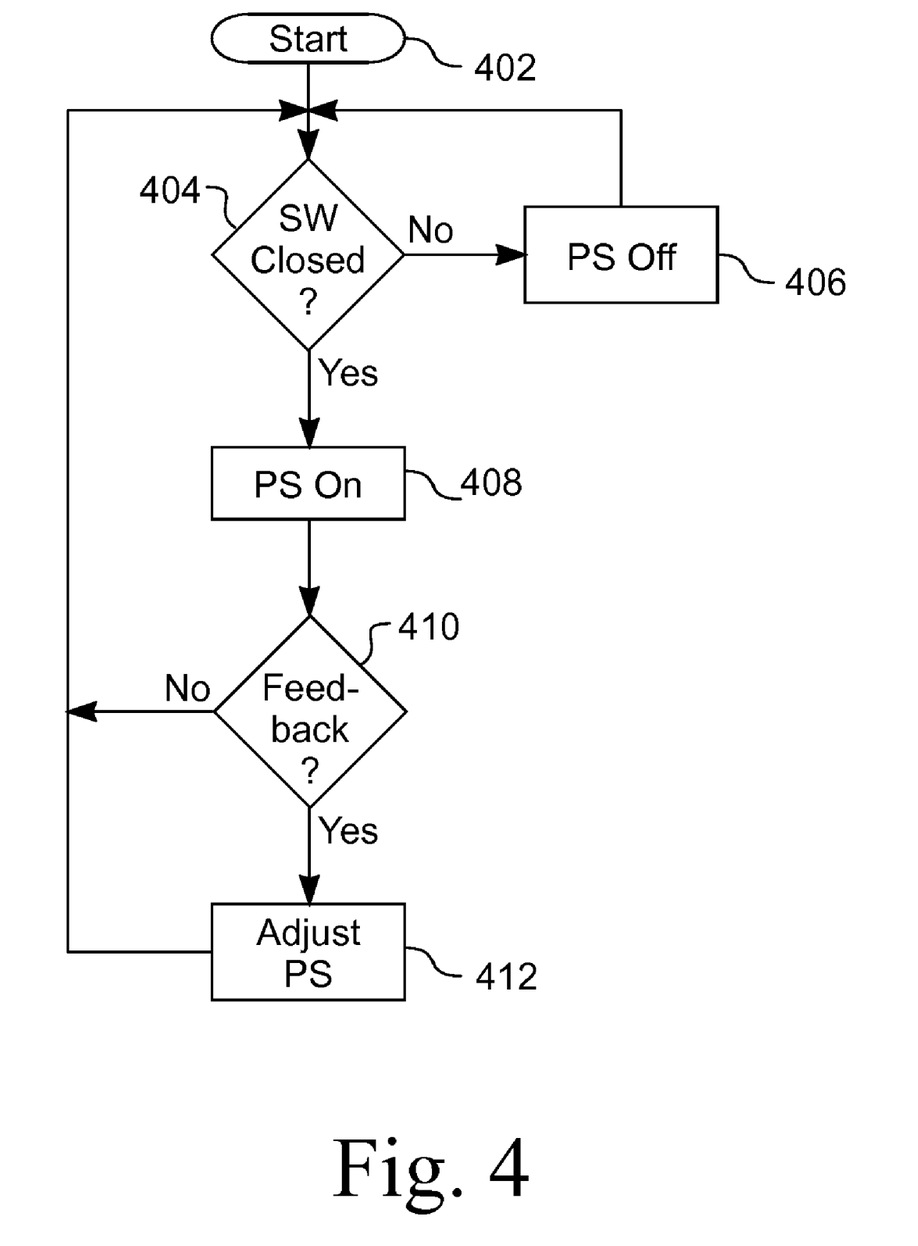
FIG. 4 is a flow diagram of one embodiment of the functions of the portable cable assembly.

FIG. 4 illustrates a flow diagram of one embodiment of the functions of the portable cable assembly 102. At the start 402, the first step 404 is to check if the switch 130 is open or actuated to the closed position. If the switch 130 is open, then the power supply 302 is off 406 and the check 404 repeats.

If the switch 130 is actuated, then the transmitter 106 is coupled to the receiver 104. The next step 408 is that the power supply 408 is turned on, which energizes the transmitting inductor 306. The next step 410 is to check if there is a feed back signal from the sensor 128. If there is no feedback signal, then the loop repeats at the check switch 130 step 404. If there is a feedback signal, then the next step 412 is to adjust the power supply 302. Then the loop repeats at the check switch 130 step 404.

The portable cable assembly 102 continuously loops through these steps. The portable cable assembly 102 only consumes power when the switch 130 is closed, which only occurs when the transmitter 106 is coupled to the receiver 104. Otherwise, the switch 130 is normally open and the portable cable assembly 102 does not consume any power.

Figure 5:
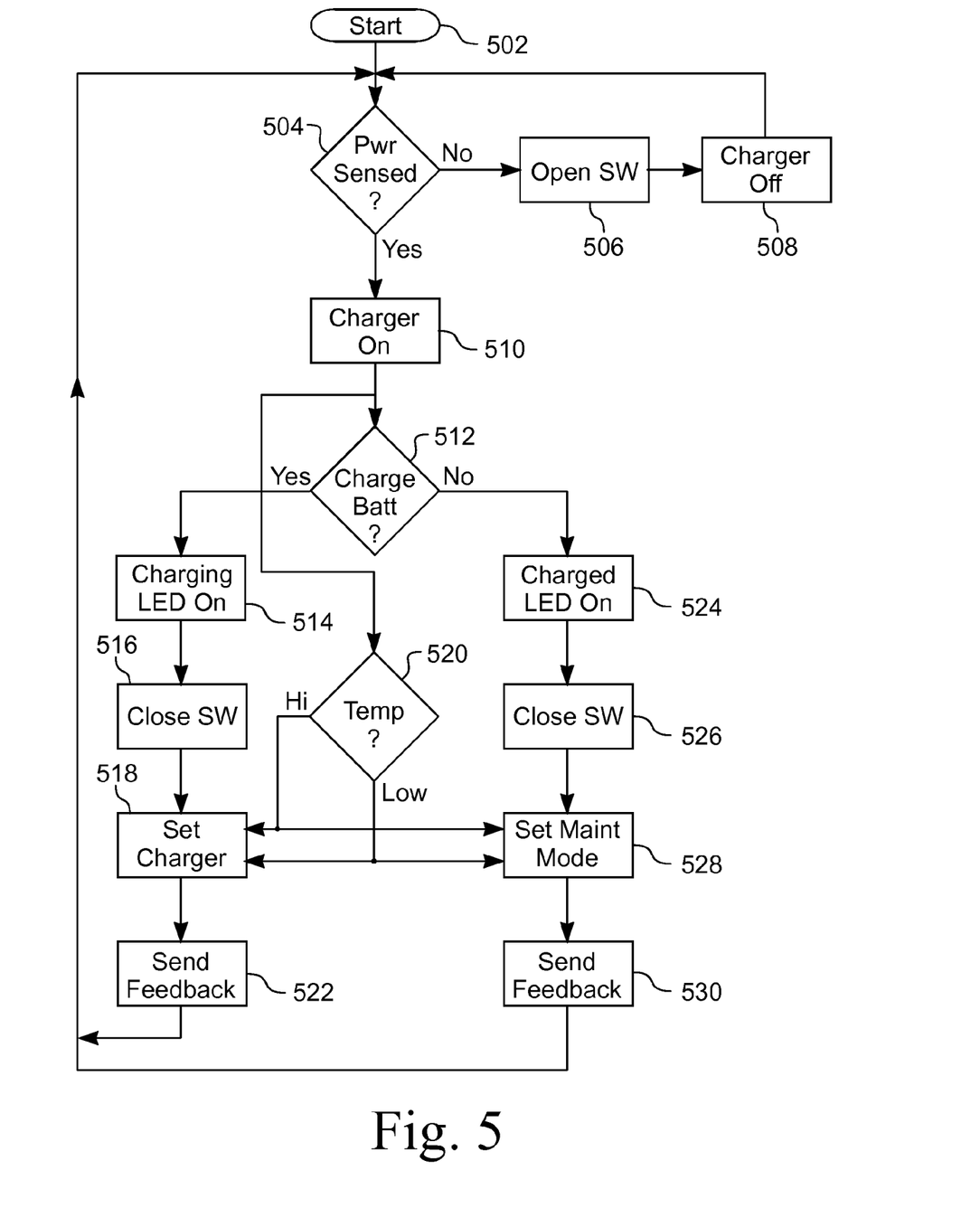
FIG. 5 is a flow diagram of one embodiment of the functions of the power receiver.

FIG. 5 illustrates a flow diagram of one embodiment of the functions of the power receiver 104 for an embodiment in which the power converter 304 is used as a battery charger 304 for a battery 314. For some other embodiments, the temperature sensor 310 is not used and the step 520 associated with temperature monitoring is not required.

At the start 502, the first step 504 is to check if power is sensed from the receiving inductor 308. If power is not available, then the switch 312 is open 506 and the charger 304 is off 508. If power is not available, then the loop repeats the step 504 of checking if power is sensed.

If power is available, then the charger 304 is energized or turned on 510. The next step 512 is to determine if the battery 314 is to be charged. The charger 304 includes circuitry that determines the charge status of the battery 314. In one embodiment, the charger 304 measures the voltage of the battery 314 and, based on the temperature measured by the temperature sensor 310, determines if the battery 314 is fully charged. In another embodiment, the charger 304 tests the battery 314, such as by performing a discharge test, and, based on the results, determines the state of charge of the battery 314.

If the battery 314 does not need to be charged, that is, it is fully charged, then the charged indicator 202 is turned on 524, the isolation switch 312 is closed 526, the charger 304 is set 528 to the maintenance mode, a feedback signal is sent 530 to the transmitter 106, and the receiver 104 loops back to the sensing power check 504. The charged indicator 202 provides visual and/or audible indication that the battery 314 is fully charged and on maintenance mode. The isolation switch 312 is closed 526 to connect the charger 304 to the battery 314.

The maintenance mode is set 528, which means that the charger 304 monitors the battery state and applies sufficient voltage and current to maintain the battery 314 at a specified level of readiness or charge. Also, the temperature is checked 520. If the temperature is high or low, the output voltage of the charger 304 is set accordingly as part of setting 528 the maintenance mode. For example, the maintenance mode voltage is increased as the temperature decreases, and vice versa.

Because the battery 314 is fully charged, the power requirements of the power transfer assembly 100 are reduced compared to the charging mode. The charger 304 communicates a feedback signal to the power supply 302 through the signal coil 204 and sensor 128 such that the power supply 302 adjusts its power output to match the reduced demand.

If the battery 314 needs to be charged, then the charging indicator 202 is turned on 514, the isolation switch 312 is closed 516, the charger 304 is set 518 to the charge mode, a feedback signal is sent 522 to the transmitter 106, and the receiver 104 loops back to the sensing power check 504. Also, the temperature is checked 520. If the temperature is high or low, the charger 304 is set 518 accordingly. For example, an increasing temperature may indicate an overcharging condition and the charger 304 is adjusted to reduce the charging current.

The charging indicator 202 provides visual and/or audible indication that the battery 314 is charging. In one embodiment, the charging indicator 202 is the same device as the charged indicator 202 and the different state is indicated by a difference in illumination intensity, color, period or duty cycle, and/or by a difference in sound. For example, battery charging is indicated with an indicator 202 that is blinking and a fully charged battery 314 is indicated with the indicator 202 illuminated continuously.

The isolation switch 312 is closed 516 to connect the charger 304 to the battery 314. The charge mode is set 518, which means that the charger 304 monitors the battery state and applies sufficient voltage and current to charge the battery 314 at a specified rate. In one embodiment, the temperature of the battery 314 is monitored 520 and the charging voltage is adjusted to compensate for temperature. Because the battery 314 is being charged, the power requirements of the power transfer assembly 100 are increased compared to the maintenance mode. The charger 304 communicates a feedback signal to the power supply 302 through the signal coil 204 and sensor 128 such that the power supply 302 adjusts its power output to match the increased demand.

The power transfer assembly 100 includes various functions. The function of releasably connecting the transmitter 106 to the receiver 104 is implemented, in one embodiment, by the magnetic latches 122, 124. The magnetic latches 122, 124 have sufficient strength to support said transmitter 106 and cable 116 in said receptacle 110 until a specified pulling force is applied, such as when the vehicle to which the receiver 104 is attached drives away from the location where the portable cable assembly 102 is plugged into a power receptacle 318 connected to an external power source 320.

The function of isolating the electrical system connected to the receiver 104 from the external power source 320 is implemented, in one embodiment, by the interface between the plug 108 and the receptacle 110, which has no direct electrical connection between the two. The magnetic coupling of the transmitting and receiving inductors 306, 308, the signal coil 204 to the sensor 128, and the magnet 206 to the power switch 130 electrically isolate the circuit in the portable cable assembly 102 from the circuit in the power receiver 104. By having no direct electrical connection between the transmitter 108 and the receiver 104, galvanic isolation is achieved. In one embodiment, a ground connection to the vehicle is made through the power transfer assembly 100.

The function of energizing the transmitter 106 without an electrical connection is implemented, in one embodiment, by the magnet 206 in the receiver 104 being magnetically coupled to the power switch 130 in the transmitter 106 and the power switch 130 being wired to connect the external power source 320 to the power supply 302.

The function of providing feedback to the transmitter 106 without an electrical connection is implemented, in one embodiment, by the signal coil 204 in the receiver 104 being magnetically coupled to the sensor 128 in the transmitter 106.

The function of indicating the status of the battery 314 and/or the charger 304 is implemented, in one embodiment, by the indicator 202 in the receiver 104. In order to maintain electrical isolation, the illumination from the indicator 202 is transported by a light pipe 126 such that the indicator 202 is visible on the transmitter 106.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for transferring power, said apparatus comprising:
   a transmitter including
      a power cable configured to electrically connect to an external power source,
      a power supply electrically connected to said power cable,
      a power switch operatively connected to said power supply,
      a transmitting inductor electrically connected to said power supply, and
      a plug portion having at least one first magnetic latch portion;
   a receiver including
      a receptacle configured to receive said plug portion of said transmitter with a specified alignment,
      at least one second magnetic latch portion positioned to engage a corresponding one of said at least one first magnetic latch portion when said plug portion is received in said receptacle, said transmitter releasably secured to said receiver by a magnetic attraction between said at least one first and second magnetic latch portions,
      a magnet positioned to actuate said power switch when said plug portion is received in said receptacle thereby energizing said power supply when said power plug is electrically connected to a power source,
      a receiving inductor positioned to be magnetically coupled to said transmitting inductor when said plug portion is received in said receptacle,
      a power converter electrically connected to said receiving inductor, said receiving inductor providing power to said power converter when said power supply excites said transmitting inductor, and
      an isolation switch electrically connected between an output of said power converter and an output of said receiver, said isolation switch actuated by said power converter being energized by said receiving inductor thereby allowing said power converter to be electrically connected to said output of said receiver, and an alignment mechanism that maintains said specified alignment between said plug portion and said receptacle when said plug portion is received by said receptacle.

2. The apparatus of claim 1 further including a first communications device in said receiver and a second communications device in said transmitter, said first communications device connected to said power converter, said first communications device communicating with said second communications device to control said power supply in order to provide a quantity of power to said transmitting inductor that matches a requirement of said receiver, and said second communications device communicates with said first communications device to provide a signal corresponding to a capacity of said power supply and said power converter operates within said capacity of said power supply.

3. The apparatus of claim 1 wherein said alignment mechanism includes a key protruding from one of said receptacle and said plug portion, and a corresponding notch in an other one of said receptacle and said plug portion.

4. The apparatus of claim 1 wherein said receptacle includes a collar configured and dimensioned to receive said plug portion.

5. The apparatus of claim 1 wherein said power converter is a charger, and further including a temperature sensor electrically connected to said charger, said temperature sensor responsive to a temperature proximate said battery, and said charger providing a charging voltage dependent upon said temperature detected by said temperature sensor.

6. The apparatus of claim 1 wherein said power converter is a charger, and further including an indicator selectively displaying one of a charging status and a charged status, said transmitter including a light pipe coupled to said indicator wherein said light pipe provides visual indication on said transmitter from said indicator.

7. An apparatus for transferring power from a power source to a receiver on a vehicle, said receiver including a receiving inductor for power transfer, said apparatus comprising:
a power cable configured to electrically connect to the power source;
a power supply electrically connected to said power cable;
a transmitting inductor electrically connected to said power supply;
a plug portion configured to mate with a receptacle on the receiver with a specific alignment, said plug portion having a cylindrical shape with an end that is substantially flat, said end of said plug portion having a plug magnetic latch configured to cooperate with a corresponding receptacle magnetic latch in said receptacle, said transmitting inductor proximate a surface of said end of said plug portion, said transmitting inductor configured to be magnetically coupled with the receiving inductor in the receiver, said transmitting inductor configured to transfer power from said power supply to the receiving inductor; and
a power switch operatively connected to said power supply, said power switch selectively allowing said power supply to be energized when said plug portion is mated with said receptacle.

8. The apparatus of claim 7 further including an alignment mechanism on said plug portion, said alignment mechanism including one of a key and a notch positioned to engage a corresponding structure on the receiver.

9. The apparatus of claim 7 further including a first communications device said plug portion, said first communications device configured to be responsive to a second communications device in the receiver, said first communications device electrically connected to said power supply, and said first communications device receiving a feedback signal communicated to said power supply and sending a capacity signal to said receiver whereby said capacity signal corresponds to a maximum capacity of said plug.

10. The apparatus of claim 7 further including a sending unit in said plug portion, said sending unit configured to provide a signal to a signal coil in the receiver, said sending unit electrically connected to said power supply, and said sending unit configured to provide data to the receiver whereby said data includes a capacity of said power supply and said receiver operates so as not to exceed said capacity.

11. The apparatus of claim 7 further including an indicator selectively displaying one of a charging status and a charged status, said indicator including a light pipe attached to said plug portion, said light pipe receiving a visual signal from said receiver wherein said light pipe provides visual indication at said plug portion.

12. An apparatus for transferring power from a portable cable assembly that includes a plug with a plug magnetic latch, a transmitting inductor, and a power switch, said apparatus comprising:
a receptacle configured to receive the plug of the portable cable assembly, said receptacle having an alignment mechanism that aligns the plug when received by said receptacle, said receptacle having a cylindrical shape with an end that is substantially flat;
a receptacle magnetic latch in said receptacle proximate said end of said receptacle, said receptacle magnetic latch positioned to engage the corresponding plug magnetic latch when said receptacle receives the plug, said receptacle releasably securing said plug by a magnetic attraction between said receptacle magnetic latch and plug magnetic latch;
a receiving inductor proximate said end of said receptacle, said receiving inductor positioned to be magnetically coupled to the transmitting inductor in the plug when the plug is mated with said receptacle; and
a power converter electrically connected to said receiving inductor, said receiving inductor providing power to said power converter when the plug is received in said receptacle and said transmitting inductor is transmitting power.

13. The apparatus of claim 12 wherein said alignment mechanism includes a key protruding from said receptacle, said key engaging a corresponding structure in said plug when said plug is received by said receptacle.

14. The apparatus of claim 12 further including an isolation switch electrically connected to said power converter, said isolation switch actuated when said power converter is energized by said receiving inductor thereby allowing said power converter to be electrically connected to an external circuit.

15. The apparatus of claim 12 further including a magnet positioned proximate said receptacle, said magnet configured to actuate the power switch in the plug when the plug is mated with said receptacle.

16. The apparatus of claim 12 further including a first communications device proximate said receptacle, said first communications device connected to said power converter, said first communications device configured to communicate a feedback signal to said plug when said plug portion is received in said receptacle, said first communications device configured to receive a capacity signal from said plug portion and said power converter operates according to said capacity signal, whereby said capacity signal corresponds to a maximum capacity of said plug.

17. The apparatus of claim 12 wherein said receptacle is attached to a vehicle, said magnetic attraction sufficiently weak to allow said receptacle to separate from the plug when the plug is mated with said receptacle and said vehicle moves away from the plug.

18. The apparatus of claim 12 wherein said power converter is a charger, and further including a temperature sensor electrically connected to said charger, said temperature sensor responsive to a temperature proximate said battery, and said charger providing a charging voltage dependent upon said temperature detected by said temperature sensor.

19. The apparatus of claim 12 wherein said power converter is a charger, and further including a communication connection configured to connect the receiver to a battery management system to transfer data from said receiver to the battery management system.

20. The apparatus of claim 12 wherein said power converter is a charger, and further including an indicator selectively displaying one of a charging status and a charged status, said indicator positioned to direct a visual signal toward said plug wherein said visual signal is visible on said plug.

* * * * *